US009689112B2

(12) United States Patent
Jenkines et al.

(10) Patent No.: US 9,689,112 B2
(45) Date of Patent: Jun. 27, 2017

(54) METHOD FOR MAKING POLYURETHANE FOAM FLOOR COVERING PRODUCTS WITH POSTCONSUMER CARPET FIBERS

(71) Applicants: Randall C. Jenkines, Dalton, GA (US); Thomas H. Perry, Jr., Dalton, GA (US)

(72) Inventors: Randall C. Jenkines, Dalton, GA (US); Thomas H. Perry, Jr., Dalton, GA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/945,416

(22) Filed: Nov. 18, 2015

(65) Prior Publication Data
US 2016/0069016 A1 Mar. 10, 2016

Related U.S. Application Data

(63) Continuation of application No. 13/698,308, filed as application No. PCT/US2011/037089 on May 19, 2011, now abandoned.

(60) Provisional application No. 61/354,863, filed on Jun. 15, 2010.

(51) Int. Cl.
| *D06N 3/14* | (2006.01) |
| *B32B 5/18* | (2006.01) |
| *D06N 3/00* | (2006.01) |
| *B29C 44/56* | (2006.01) |
| *B29K 105/12* | (2006.01) |
| *B29K 75/00* | (2006.01) |
| *B29L 31/00* | (2006.01) |
| *B29C 44/32* | (2006.01) |

(52) U.S. Cl.
CPC ............ *D06N 3/14* (2013.01); *B29C 44/332* (2016.11); *B29C 44/569* (2013.01); *B32B 5/18* (2013.01); *D06N 3/0002* (2013.01); *D06N 3/0043* (2013.01); B29K 2075/00 (2013.01); B29K 2105/128 (2013.01); B29L 2031/732 (2013.01); *D06N 2205/04* (2013.01); *D06N 2205/18* (2013.01); *D06N 2211/066* (2013.01); Y02P 70/649 (2015.11); Y10T 428/249953 (2015.04)

(58) Field of Classification Search
CPC ...... D06N 3/14; D06N 3/0002; D06N 3/0043; D06N 2205/18; D06N 2211/066; D06N 2205/04; B29C 44/32; B29C 44/569; B29C 44/5618; B29C 67/221; B29K 2105/128; B29K 2075/00; B32B 5/18; B32B 5/20; B32B 5/245; B32B 5/28; B32B 2260/021; B32B 2260/046; A47G 27/0468; D04H 13/00; D04H 1/64; D04H 3/16; Y10T 156/1023; Y10T 428/24802; Y10T 428/26; Y10T 428/29; Y10T 428/2904; Y10T 428/2913; Y10T 428/2935
See application file for complete search history.

(56) References Cited

U.S. PATENT DOCUMENTS

| 3,860,371 | A | * | 1/1975 | Willy ..................... B29C 44/12 264/45.3 |
| 4,014,826 | A | | 3/1977 | Yunan |
| 4,269,889 | A | | 5/1981 | Takegi |
| 4,386,983 | A | | 6/1983 | Hipchen |
| 4,985,279 | A | | 1/1991 | Mussallem |
| 5,804,005 | A | | 9/1998 | Buck |
| 5,897,066 | A | | 4/1999 | Bacon |
| 5,908,701 | A | | 6/1999 | Jennings |
| 7,241,407 | B2 | * | 7/2007 | Blomqvist ............. B27N 3/005 156/247 |
| 7,279,065 | B1 | | 10/2007 | Ogle |
| 7,361,695 | B2 | | 4/2008 | Tu |
| 2005/0126681 | A1 | | 6/2005 | Morgan |
| 2005/0260913 | A1 | | 11/2005 | Doesburg |
| 2007/0092688 | A1 | | 4/2007 | Doesburg |
| 2008/0075915 | A1 | | 3/2008 | Wening |

FOREIGN PATENT DOCUMENTS

WO 2003/103922 A 12/2003

* cited by examiner

*Primary Examiner* — Jennifer A Steele
(74) *Attorney, Agent, or Firm* — Gary C Cohn PLLC

(57) ABSTRACT

Polyurethane floor covering products are formed from a web layer containing at least 30% by weight fibers. A cooled polyurethane foam formulation which includes at least one polyisocyanate, water and at least one polyol having an equivalent weight of at least 500 is applied to the web layer. The wetted web layer is then compressed to mechanically wet out the fibers, gauged and heated to cure the foam formulation.

7 Claims, No Drawings

METHOD FOR MAKING POLYURETHANE FOAM FLOOR COVERING PRODUCTS WITH POSTCONSUMER CARPET FIBERS

The present invention relates to methods for making polyurethane foam floor covering products.

Used and discarded carpet products present a significant disposal problem, due to the volume of these products that are removed from office buildings, institutional settings and residences each year. These discarded products are sent mainly to landfills where they take up large amounts of landfill capacity. The fibers which comprise much of the carpet weight are rarely biodegradable, and so the discarded carpet is expected to remain more or less intact in the landfill for centuries.

Therefore, there is a stimulus towards recycling some or all of the fiber values that remain in discarded carpet products. To this end, various approaches have been developed to mechanically shred discarded carpet products and recover some or all of the fiber values that they contain. An example of such an approach is described in U.S. Pat. No. 5,897,066.

Once the fiber values are recovered, there remains the problem of what to do with them. The recovered fibers are not suitable for producing new carpet facings, for several reasons. The recovered fibers tend to be heavily damaged due to wear and the recovery process itself. They are often contaminated with other components of the carpet products, such as small particles of a latex binder, inorganic filler particles, and the like, which are hard to separate completely from the fibers. In addition, the fibers often have been dyed, and often are stained or contain other absorbed contaminants.

Therefore, alternative uses are needed for these recovered fibers.

One potential use for these fibers is in underlayment cushion. Underlayment is widely installed under carpet materials to provide cushioning. Because underlayment is concealed under the overlying carpet, its appearance is usually not important. Consumers resist paying significant amounts for a material that they cannot see, and so low cost is a primary concern. Therefore, underlayment is often made of inexpensive starting materials, including pieces of scrap foam which are formed and bonded together into a "rebond" material. Underlayment applications are therefore a potential application for fibers that are recovered from post-consumer carpet products.

US Published Patent Application 2008/0075915, for example, describes a carpet underlayment that makes use of postconsumer carpet fibers. The fibers are mixed with pieces of foam and a thermal binder, shaped into a batt, and heated to melt the binder and thereby adhere the various constituents to each other. The preferred binders in 2008/0075915 are sheath/core bicomponent fibers.

Other fiber-containing carpet underlayment products have been formed by impregnating fibers with various types of binders. U.S. Pat. No. 4,014,826, for example, describes a similar process similar to that of 2008/0075915, in which a special type of fibers (which are not post-consumer fibers) are used. A non-foaming latex or urethane is used as the binder in U.S. Pat. No. 4,014,826. In GB 599682, GB 1,145,932, U.S. Pat. No. 3,480,456 and US Published Patent Application 2006-0144012, needled fiber batts are impregnated with various thermosetting and/or thermoplastic binder materials. In U.S. Pat. No. 3,952,126, a mixture of polyurethane crumb and staple fibers is needled to form a batt. In U.S. Pat. No. 4,683,246, fiber filaments and foam crumb are mixed with a polyurethane prepolymer and steam cured into buns. U.S. Pat. No. 6,596,387 and US Published Patent Application 2005-0126681 describe forming pad products by forming bi-layers of polyurethane or latex foam and fiber batts.

U.S. Pat. Nos. 4,269,889 and 4,296,054 describe molded polyurethane foams that are reinforced with polymer fibers to produce molded foam products for applications such as automotive seating. A polyurethane foam formulation is introduced into a mold, followed by a mass of entangled fibers of a special type. The polyurethane is partially cured in the mold, and then demolded and postcured. This molding process can produce composites of polyurethane foam and fibers, but is not applicable for making large surface area products such as carpet underlayment, as molds of the required dimensions are not available at any reasonable cost, and cure times are too long to be feasible in a floor covering manufacturing process. In addition, a special type of fibers is necessary in the process described in U.S. Pat. Nos. 4,269,889 and 4,296,054.

To date, none of the foregoing processes has been found to be satisfactory. Floor cushioning products must not only be manufactured inexpensively, but they should also meet certain performance criteria. Among the performance criteria are an acceptable tear strength, low compression sets, adequate load bearing and the ability to retain its cushioning performance during foot trafficking.

This invention is a process for preparing a foamed polyurethane floor covering product. The process comprises:

a) forming a web layer containing at least 30% by weight fibers, such that the web layer has a weight of from 150 to 600 g/m² and the fibers in the web layer have an average length of from 0.75 to 40 cm;

b) continuously applying a cooled polyurethane foam formulation which includes at least one polyisocyanate, water and at least one polyol having an equivalent weight of at least 500 to the web layer and compressing the web layer and applied polyurethane foam formulation together to mechanically wet out the fibers in the web layer; and then c) gauging the wetted web layer to a thickness of from 0.25 to 1.0 inches and, while maintaining the gauge, heating the polyurethane foam formulation to a temperature of from 80 to 160° C. to cure the polyurethane foam formulation to produce a cured and gauged polyurethane foam cushion containing from 5 to 50% by weight of the fibers.

This process offers several advantages. Post-consumer fibers, such as those obtained from discarded carpet, are entirely suitable for use in the process. The polyurethane foam and the fibers become intimately and highly uniformly distributed in the process, which leads to a product having highly uniform and consistent properties. The product can be manufactured inexpensively; in particular, the foam formulation often fully cures in five minutes or less to produce a foam that exhibits minimal roll set (as described more fully below). The fast cure makes the process economically feasible to operate at an industrial scale, where large volumes of product must be made continuously and at commercially reasonable line speeds. The fast cures also make the process feasible for making broadloom products which have widths of 6 feet or more. In addition, a dense polyurethane skin often forms on one or both surfaces of the product. This skin can make it unnecessary to attach a separate film layer to the surfaces of the product, as is often done with prior art underlayment products to prevent them from absorbing fluids, or for other reasons. The process is also versatile, and adaptable to manufacturing a variety of cushion products including traditional underlayment as well as attached cushion carpet products.

The process of the invention begins with the formation of a web layer that contains fibers. The fibers may be formed into a web layer using any convenient process such as various blowing and laydown methods, or by carding. "Carding" is used here in its usual context to mean that the fibers have been through a process which somewhat disentangles them and arranges individual fibers so that they become roughly parallel to each other. The result is a lightweight "fluff" material similar in nature to cotton balls, although typically at a still lower weight per unit volume. The fibers themselves are short fibers that have a weight average length of from 0.3 inches to 15 inches (0.75 cm to about 40 cm), preferably from 0.75 to 10 inches (1.9 to 25 cm). It is preferred that at least 80 weight percent, more preferably at least 90 weight percent of the fibers have lengths between 0.75 inches and 10 inches (1.9 to 25 cm).

The fibers are formed into a web layer, such that the weight of the layer per unit area is from 150 to 600 g/m². The height of the web layer will of course depend on the density of the web layer, which in turn depends mainly on how tightly the individual fibers are packed together. In general, the thickness of the web layer is generally approximately equal to or slightly larger than the thickness of the final product, or from about 0.25 to 1.0 inch thick, although the thickness may vary somewhat and may vary somewhat across the layer.

The web layer may be formed by depositing the fibers onto a suitable surface of sufficient width. The fibers may be so deposited in a continuous manner, immediately before the polyurethane foam formulation is applied to the layer, in effect integrating the step of forming the web layer into a single operation with the remaining steps of the overall process. Alternatively, the web layer can be made in a preliminary step, with the previously-formed web layer in that case being stored until needed.

The web layer may be needle-punched, heat-set or otherwise treated to entangle the fibers and thus increase its mechanical integrity. Similarly, various types of binders can be applied to the web layer for the same reason. Suitable types of binders include various types of binder fibers as well as liquid, thermoplastic and/or thermosetting binders. However, an advantage of this invention is that treatments such as entanglement and/or the application of a binder are not necessary in order to produce a good quality product, and those steps can be and preferably are omitted from the process.

The fibers used to make the web layer can be any type that can withstand the temperatures encountered in the curing step. Polymeric fibers such as nylon or other polyamide, polypropylene, polyethylene, polyester, and the like are all useful, as are natural fibers such as cotton, hemp or wool fibers. Carbon fibers can be used as well. Waste fibers from industrial processes also can be used, including, for example, selvedge trimmings, yarn waste and the like. However, it is highly preferred, primary for reasons of cost and ecology, to use fibers that are obtained from postconsumer carpeting products. These fibers preferably consist of or are mainly fibers obtained from a cut or continuous loop pile of a pile carpet. These pile fibers may be contaminated with particles of a binder material, which in the original carpet served to adhere the fibers to a backing or scrim material, as well as particles of inorganic materials such as clay, which is often used as a filler in binder compositions that are used to construct pile carpets. The fibers may also contain parts of a backing or scrim material from the original carpet. The fiber denier is suitably from 5 to 50, and is more preferably from 10 to 25.

The web layer may also contain other materials, in addition to the fibers. Such materials preferably are soft and flexible, so as not to interfere with the cushioning properties of the product, and preferably have low densities. The other materials, if present, should be in the form of a particulate having a largest dimension of no greater than about 1 inch (2.5 cm) and preferably no greater than ½ inch (1.25 cm). Polymeric foams are useful additional materials, if ground or otherwise formed into small pieces. Foamed natural or synthetic rubbers are preferred types, including polyurethane foams. These polymeric foams can be virgin materials, but it is preferred for reasons of cost and ecology to use waste material or postconsumer materials. If these additional materials are present in the web layer, the fibers should constitute at least 30% and preferably at least 50% of the weight of the web layer.

A polyurethane foam formulation is applied to the web layer, and the wetted web layer is then compressed to mechanically wet out the fibers with the polyurethane foam formulation. The manner of doing this is not considered to be critical to the invention, provided that the polyurethane foam formulation becomes well-distributed within the web layer. A convenient way to carry out these steps industrially is to position the web layer on a moving platform, such as a conveyor belt, tenter frame or similar apparatus which permits the web layer to be moved lengthwise relative to the point of application of the polyurethane foam formulation and to apply the polyurethane foam formulation to the moving web layer. A traversing dispensing head, which travels back and forth across the width of the fiber web layer, can be used to distribute the polyurethane foam formulation onto the web layer. The layer is easily mechanically compressed by passing it under a roller, between rollers, or under a doctor blade. The web layer may be compressed to 5% to 35% of its original thickness, to force individual fibers into contact with the polyurethane foam formulation. It is often useful to apply a layer of protective film onto the top of the wetted web layer before compressing it, or as it is compressed, so that the device used to compress the film does not become contaminated with the polyurethane foam formulation. Similarly, another layer of protective film may be interposed between the web layer and the moving platform.

From about 1 to about 19 parts, preferably from 1 to 9 parts, and still more preferably from 2 to 5 parts by weight of the polyurethane foam formulation can be applied in this step, per part by weight of the web layer.

The polyurethane foam formulation contains at least one polyisocyanate, water and at least one polyol having an equivalent weight of at least 500, and may contain other components as well, as described more fully below. Polyurethane foam formulations of this type are highly reactive. Therefore, the polyurethane foam formulation is at most only partially formulated ahead of time, with the polyisocyanate being kept separate from the water, polyol and other isocyanate-reactive compounds until immediately before being dispensed. Once the polyisocyanate is mixed with the water and the polyol, the gelling and blowing reactions which form the foam begin to occur within a few seconds. The steps of applying the polyurethane foam formulation to the fiber web layer and mechanically compressing the wetted fiber web layer should be performed before the blowing and gelling reactions proceed to a significant extent. In most cases, these steps should be performed within 15 seconds of the time that the polyisocyanate is contacted with the water and the polyol in the polyurethane foam formulation. It is more preferred to perform these steps with 10 seconds or within 7 seconds of that time.

The components of the polyurethane foam formulation are cooled before mixing the together and applying the foam formulation to the web layer. The components preferably each have a temperature of less than 15° C., more preferably 10° C. or less, at the time they are mixed. Any lower temperature is suitable, provided that the components remain liquid and are not too viscous to process easily. It is usually not necessary to cool the components to below 0° C. This cooling slows the initial progress of the blowing and gelling reactions, and so extends the process window for conducting the application and wetting steps. Once the components are mixed and the foam formulation begins to react, an exothermic reaction takes place which will increase the temperature of the formulation. The temperature of the foam formulation should be no more than 20° C., preferably no more than 15° C. and still more preferably no more than 12° C. when it first contacts the web layer.

The wetted web layer is then gauged to a thickness of from 0.25 to 1.0 inches. The precise thickness will depend on the particular product being made, as well as the desired product density. Gauging is conveniently done by passing the wetted web layer under a roller or blade, or between a pair of nip rollers, or, more preferably, into a double band laminator which is pre-set at the desired thickness.

Once gauged, the wetted web layer is heated to a temperature of from 80 to 160° C. to cure the polyurethane foam formulation to produce a cured and gauged polyurethane foam cushion containing from 5 to 50% by weight of the carded fiber web. The gauge is maintained throughout the curing process, at least until such time as the foam formulation has cured enough that the cushion can maintain its gauge without applied pressure and exhibits an immediate roll set, measured as described below, of less than 10%. By "maintaining" a gauge, it is meant that the wetted web layer is kept under mechanical pressure such that its thickness is kept at the desired value. This may be done, for example, by holding the wetted web layer between two heated platens for the requisite time, or, more preferably, by passing it though a double band laminator or similar device which allows for continuous production. A double band laminator may have heated platens which provide the needed curing temperature, or may be installed in an oven or other heating device.

A preferred curing temperature is from 100 to 130° C. It may be desirable to ramp the temperature upwardly over a period of time in order to balance the blowing and gelling reactions in a way that maintains a good foam cell structure.

The curing time should be as short as practical, as shorter curing times translate to faster operating rates and lower production costs. It is generally preferred to selected the components of the polyurethane foaming formulation and the curing temperature together such that the polyurethane foam formulation cures, to the point where the product cushion can maintain its gauge without additional applied pressure and exhibits an immediate roll set of less than 10% (measured as described below), within ten minutes and preferably within five minutes or less from the time the polyurethane foam formulation is first contacted with the web layer. In the preferred process, in which the wetted web layer is cured by passing it continuously through the gauging and heating apparatus, the line speed and the length of the heating zone will be selected in conjunction with each other in order to provide sufficient time to affect the cure.

If desired, a decorative or functional pattern can be impressed into the cushion during the curing step.

The cured product is then ready for rollup, or can be taken to other downstream operations. A number of downstream operations are possible, depending on the particular type of cushioning product being manufactured. For example, release films that may be used in the manufacturing process may be removed for disposal or reuse. One or more additional layers may be affixed to the cushion, using methods such as flame lamination, or gluing, or through some mechanical method. These additional layers may be, for example, a reinforcing layer; a release layer, which permits the cushion to be easily removed from a floor in a glue-down installation; a carpet pile layer, synthetic grass layer or other type of show surface; a moisture barrier layer, an adhesive layer, and the like. These additional layers also can be attached simultaneously with the production of the foam cushion, by laying the web layer atop the additional layer, and performing the subsequent process steps of wetting, gauging and dispensing on top of that additional layer. Alternatively or in addition, the wetted fiber web layer can be formed, and an additional layer can be laid in on top of the wetted fiber web layer, before or after the gauging step, but before the polyurethane foam formulation has cured. It is noted that, because a good integral skin usually forms on the product, it is usually unnecessary to apply a moisture barrier or other skin material and because the embedded fibers provide good tear strength, reinforcement layers often can be omitted from the product.

Other possible downstream operations include trimming, cutting to length, cutting into desired shapes (such as to make floor tile products), application of various topical treatments, and the like.

Exclusive of these optional additional layers, the product cushion typically has a bulk density of from about 2.5 to 15 pounds/cubic foot (40-240 kg/m$^3$), preferably from 3 to 10 pounds/cubic foot (48-160 kg/m$^3$) and more preferably from 4 to 8 pounds/cubic foot (64-128 kg/m$^3$). The fiber content may range from 5 to 50% by weight, is more preferably from 10 to 50% by weight and still more preferably from 16 to 33% by weight.

Cushion products made in accordance with the invention and having bulk densities and fiber contents as just mentioned, often have other desirable properties that make them suitable for a variety of floor covering applications. They often have 50% compression sets of less than 15%, as measured at 70° C. according to the method described below. They often exhibit a 25% identation load deflection (ILD) of at least 14 kPa, preferably at least 20 kPa, up to 41 pKa, as measured according to the method described below. They often retain greater than 30% and more typically greater than 50% of their 25% ILD value when subjected to the simulated foot traffic test described below.

The polyurethane-forming mixture includes at least one organic polyisocyanate, which may be an aromatic, cycloaliphatic, or aliphatic isocyanate. Aromatic polyisocyanates are preferred and, among these, diphenylmethane diisocyanate (MDI) and/or a polymethylene polyphenylisocyanate (PMDI) are preferred on the basis of generally greater reactivity, availability and cost. MDI may be the 2,4'-isomer, the 4,4'-isomer, or some mixture thereof. PMDI is generally a mixture of one or polymethylene polyphenylisocyanates and some MDI; the MDI portion of the mixture may be either or both of the 2,4- and the 4,4'-isomers. Prepolymers can be formed from any of the foregoing polyisocyanates by reacting an excess of the polyisocyanate with a polyol, aminoalcohol or polyamine. A preferred type of prepolymer is described in EP 485,953B. The polyisocyanate is generally used in an amount sufficient to provide an isocyanate index of from about 0.85 to 1.5, preferably from 0.9 to 1.25.

The polyurethane foam formulation also includes at least one polyol that has an equivalent weight (per hydroxyl group) of at least 500. Two or more such polyols may be present. The equivalent weight of this polyol is preferably from about 750 to 3000, and more preferably from 1000 to 2000. The polyol should have an average of from about 1.8 to 4, preferably from about 2 to about 3, hydroxyl groups per molecule. The polyol may have secondary hydroxyl groups or primary hydroxyl groups, or some combination thereof; however, it is preferred that at least 50% of the hydroxyl groups, and more preferably at least 80% of the hydroxyl groups, are primary hydroxyl groups, as these are more reactive towards isocyanate groups and thus allow the formulation to cure faster. These polyols may be polyester polyols, polyether polyols, polyols that are prepared from vegetable oils and/or fatty acids, or other types. Polyether polyols are preferred, especially polymers of propylene oxide which contain from 5 to 25% by weight of terminal poly(ethylene oxide) blocks.

An especially preferred type of polyol is an amine-initiated polyol that contains primarily primary hydroxyl groups, such as those described in U.S. Pat. No. 6,762,274.

The polyurethane foam formulation also includes water, which reacts with the polyisocyanate to simultaneously generate a blowing gas (carbon dioxide) and to build molecular weight though the formation of urea linkages. Water is generally present in an amount from about 2 to about 7 parts by weight per 100 parts by weight of the polyol(s) that have an equivalent weight of 500 or more. A preferred amount is from 3 to 6 parts, on the same basis.

The polyurethane foam formulation may contain various other components, in addition to the aforementioned polyisocyanate, polyol and water.

A catalyst is preferably present. A wide variety of amine and organotin catalysts are suitable, including include di-n-butyl tin bis(mercaptoacetic acid isooctyl ester), dimethyltin dilaurate, dibutyltin dilaurate, dibutyltin diacetate, dibutyltin sulfide, stannous octoate, lead octoate, nickel acetylacetonate, ferric acetylacetonate, bismuth carboxylates, triethylenediamine, N-methyl morpholine, like compounds and mixtures thereof. An amine-blocked tin (IV) catalyst, such as those described in U.S. Pat. No. 5,491,174, can be used. It is generally not desirable to use a delayed action catalyst, in view of the need for a rapid cure once the wetting step has been completed. If an organometallic catalyst is employed, it is generally present in an amount from about 0.01 to about 0.5 parts per 100 parts of the polyurethane foam formulation, by weight. If a tertiary amine catalyst is employed, the catalyst preferably is present in an amount from about 0.01 to about 3 parts of tertiary amine catalyst per 100 parts of the polyurethane-foam formulation, by weight.

The polyurethane foam formulation may include at least one surfactant, which serves to stabilize the foam bubbles until the composition has cured. Organosilicone surfactants, such as those described in U.S. Pat. No. 4,483,894, are preferred. If a surfactant is present, it is typical to include up to about 3 parts of surfactant per 100 parts by weight polyols. However, one surprising benefit of this invention is that the surfactant can often be omitted, while still producing a good quality foam having a reasonably uniform cell structure.

One or more crosslinkers, by which it is meant a compound having at least three isocyanate-reactive groups and an equivalent weight per isocyanate-reactive group of up to 499, preferably up to 250, may be present in the polyurethane foam formulation. A chain extender, by which it is meant a compound having exactly two isocyanate-reactive groups and an equivalent weight per isocyanate-reactive group of up to 499, preferably up to 250, also may be present. Crosslinkers and chain extenders are usually used in small amounts, such as up to 20, preferably up to 5 and more preferably up to 2 parts by weight per 100 parts by weight of polyol(s) having an equivalent weight of 500 or more. Examples of suitable crosslinkers and chain extenders include triethanolamine, diethanolamine, monoethanolamine, glycerine, trimethylolpropane, pentaerythritol, ethylene glycol, diethylene glycol, triethylene glycol, propylene glycol, dipropylene glycol, tripropylene glycol, 1,4-dimethylolcyclohexane, 1,4-butane diol, 1,6-hexane diol, 1,3-propane diol, diethyltoluene diamine, amine-terminated polyethers such as Jeffamine D-400 from Huntsman Chemical Company, amino ethyl piperazine, 2-methyl piperazine, 1,5-diamino-3-methyl-pentane, isophorone diamine, ethylene diamine, hexane diamine, hydrazine, piperazine, mixtures thereof and the like. Amine crosslinkers and chain extenders can be blocked, encapsulated, or otherwise rendered less reactive in order to reduce the initial reactivity of the formulation and provide more working time to apply and gauge the foam layer.

The polyurethane-foam formulation may include a filler, which reduces overall cost and may improve flame resistance, firmness and other physical properties to the product. The filler may constitute up to about 50 percent of the total weight of the polyurethane foam formulation. Suitable fillers include talc, mica, montmorillonite, marble, barium sulfate (barytes), milled glass granite, milled glass, calcium carbonate, aluminum trihydrate, carbon, aramid, silica, silica-alumina, zirconia, talc, bentonite, antimony trioxide, kaolin, fly ash and boron nitride.

Other additives may be used, including fire retardants, pigments, antistatic agents, reinforcing fibers, antioxidants, preservatives, acid scavengers, and the like.

The cushioning product can be used as carpet underlayment, in home, office, industrial, institutional or other settings. In this regard, it can be installed and used in the same manner as conventional carpet padding products. As mentioned, the cushioning product may take the form of an attached cushion, on the underside of a woven or tufted carpet product. The cushioning product is also useful for other padding and cushioning application, including, for example, furniture pads and various packaging applications.

EXAMPLE 1

A formulated polyol mixture is prepared by mixing 1200 parts by weight of a 1700 equivalent weight, nominally trifunctional, amine-initiated polyol, which is prepared according to the general process of U.S. Pat. No. 6,762,274, 12 parts of an 85% solution of diethanolamine in water, 43.7 parts water and 18 parts of a 33% solution of triethylenediamine in dipropylene glycol. These are mixed thoroughly and cooled to 7° C.

Shredded post consumer carpet fibers, containing mainly nylon fibers about 8.5+/−4.8 cm in length, are carded and formed into a 30.5×30.5 layer weighing 20.9 g. This web layer is sandwiched between two layers of polyethylene release film, and placed into a 30.5 cm×30.5 cm×1.11 cm open-top mold which is preheated to 121° C. The web layer is heated in the mold for 30 minutes to drive off residual water from the layer and cooled back down to ambient temperature. The top release film layer is pulled back, and a 3500 g, 30.4-cm long roller having a diameter or 4.5 cm is placed at one end of the open mold. 104.64 g of the cooled polyol mixture is mixed with 66.08 g of a cooled (7° C.) PMDI product having an isocyanate content of 29.4% (SPECFLEX™ NE 134 isocyanate, from The Dow Chemical Company), and 65 g of the resulting polyurethane foam formulation is immediately poured over the carded fiber web in the mold. The release film is replaced, and the roller is pulled down across the mold on top of the release film, compressing the fiber web and causing the individual fibers to become wetted with the polyurethane foam formulation. The top is then placed onto the mold, the mold is placed in a 121° C. oven, and the polyurethane foam formulation is allowed to cure for five minutes at 121° C. The mold is removed from the oven and the sample is removed. The sample is aged for 7 days under the conditions specified in ASTM 3675-78 for performance property testing. Density, compression set and sample thickness are measured according to ASTM 3675-78. ILD is measured according to ASTM 3574-78.

Compression set is measured as follows. 2"×2" (5 cm×5 cm) foam specimens are formed into 2 stacks of plied specimens each approximately 1 inch (2.5 cm) thick. The stack is placed in an Instron tensile testing device equipped with a circular presser foot one square inch (6.45 cm$^2$) in area, and the thickness of the specimen is measured at an applied load of 100 grams per square inch (100 g/6.45 cm$^2$)

The specimen is then compressed to 50% of its original thickness between two parallel plates which are each larger than the specimen area. The specimen is then held at this compressed thickness and heated in a circulating air oven at 70° C. for 22 hours.

The specimen is then removed from the oven and allowed to re-expand. It is returned to the oven for 0.5 hour, and then allowed to cool for 5 to 10 minutes. The thickness is then remeasured as before. The compression set is calculated as $$C_f=100(t_o-t_f)/t_o$$

where $C_f$ is the compression set, $t_o$ is the original thickness and $t_f$ is the final specimen thickness.

Ball rebound is determined according to ASTM D3574-86 Test Method H, modified in that the sample size is 2×6 inches (2.5×15 cm), and the height of the sample is built up to about 1 inch (2.5 cm) by stacking multiple layers of the composite.

25% ILD is measured as follows. Enough 2"×6" (2.5×15 cm) skived composite specimens are stacked to form a stack of plied specimens each approximately 1 inch (2.5 cm) thick. The stack is placed in an Instron tensile testing device equipped with a circular presser foot one square inch (6.45 cm$^2$) in area, and the thickness of the specimen is measured at an applied load of 100 grams per square inch (100 g/6.45 cm$^2$). The specimen is compressed to 75% of its original thickness, using the one square inch pressure foot, and the load required to so compress the specimen is determined. This reading is the compression resistance of the foam. The procedure is repeated on a duplicate stack and the results are averaged.

Retention of 25% ILD is determined as follows. 25% ILD is measured on a sample as described above. The sample is then subjected to 12,000 compression cycles on a Hexapod tester, which simulates repeated foot traffic over the sample, and 25% ILD is re-measured as before. The retention of 25% ILD is calculated as the second 25% ILD measurement as a percentage of the initial 25% ILD measurement.

Results of the foregoing testing are as indicated in Table 1. The properties of a commercially available rebond carpet underlayment product are given for comparison.

TABLE 1

| Property | Example 1 | Commercial Rebond Underlayment |
|---|---|---|
| Cure time, min. | 5 | NA |
| Sample weight, g/m$^2$ | 1016 | 1098 |
| Post-consumer fiber content, % | 22 | 0 |
| Pad density, kg/m$^3$ | 80.4 | 96.4 |
| Thickness, mm | 12.6 | 11.3 |
| 25% ILD, kPa | 25.5 | 22 |
| 50% compression set, % | 15 | 14 |
| Ball rebound, % | 41 | 30 |
| 25% ILD retention, % | 60 | 54 |

The data in Table 1 shows that Example 1 has an ILD, compression set and ball rebound values that closely approximate those of the commercial rebond material, even though the density and pad weight are lower for Example 1, and even though Example 1 contains a significant post-consumer fiber content. The ILD retention for Example 1 is better than that of the commercial rebond material, too.

Despite the absence of a surfactant, the cushion has a good uniform cell structure and good properties.

EXAMPLE 2

Example 1 is repeated, using the following formulated polyol mixture instead of that described in Example 1:
1030 equivalent weight, nominally trifunctional, random copolymer of 87% propylene oxide and 13% ethylene oxide: 19 parts
1550 equivalent weight, nominally trifunctional ethylene oxide-capped poly(propylene oxide) having 88% primary hydroxyl groups 81 parts
85% solution of diethanolamine in water: 0.6 parts
Silicone surfactant: 1.5 parts
Water: 3.61 parts
33% solution of triethylenediamine in dipropylene glycol: 0.17 parts
30% bis(dimethylaminoethyl)ether in dipropylene glycol: 0.12 parts Conditions otherwise are identical to those of Example 1, except the mold temperature is only 100° C.

Properties are measured as for Example, with the results being as indicated in Table 2:

TABLE 2

| Property | Example 1 |
|---|---|
| Cure time, min. | 5 |
| Sample weight, g/m$^2$ | 997 |
| Post-consumer fiber content, % | 28 |
| Pad density, kg/m$^3$ | 72.4 |
| Thickness, mm | 12.7 |
| 25% ILD, kPa | 15.1 |
| 50% compression set, % | 15 |
| Ball rebound, % | 35.7 |
| 25% ILD retention, % | 77.5 |

What is claimed is:
1. A process for preparing a foamed polyurethane floor covering product that includes a cured and gauged polyurethane foam cushion containing from 5 to 50% by weight of the fibers, comprising:
   a) forming a web layer containing at least 30% by weight fibers, such that the web layer has a weight of from 150 to 660 g/m$^2$ and a thickness of 0.25 to 1 inch, and the fibers in the web layer have an average length of from 7 to 140 cm and a denier of 5 to 50;

b) continuously applying a cooled polyurethane foam formulation which includes at least one polyisocyanate, water and at least one polyol having an equivalent weight of at least 500 to the web layer, the cooled polyurethane foam formulation having a temperature of no more than 15° C. when applied to the web layer, and compressing the web layer and applied polyurethane foam formulation together to 5 to 35% of the original thickness of the web layer to mechanically wet out the fibers in the web layer; and then c) gauging the wetted web layer to a thickness of from 0.25 to 1.0 inches and, while maintaining the gauge, heating the polyurethane foam formulation to a temperature of from 80 to 160° C. to cure the polyurethane foam formulation to produce a cured and gauged polyurethane foam cushion containing from 5 to 30% by weight of the fibers.

2. The process of claim 1, wherein the cooled polyurethane foam formulation has a temperature of not more than 10° C. when applied to the web layer.

3. The process of claim 1, wherein the web layer contains at least 50% by weight of fibers.

4. The process of claim 1, wherein the web layer comprises carded fibers.

5. The process of claim 1, wherein the fibers are obtained from postconsumer carpeting products.

6. The process of claim 1, wherein the foamed polyurethane floor covering product has a density of from 3 to 10 pounds/cubic foot (48-160 kg/m$^3$).

7. A foamed polyurethane floor covering product produced by the process of claim 1.

* * * * *